J. J. BAVOR.
DIRIGIBLE HEADLIGHT.
APPLICATION FILED FEB. 6, 1920.
1,373,706.
Patented Apr. 5, 1921.
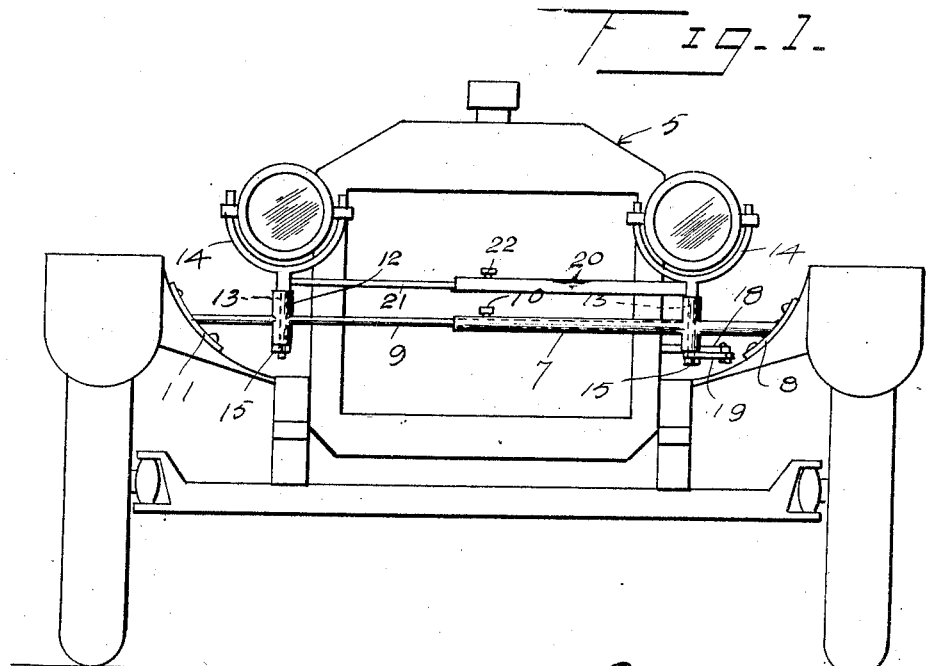
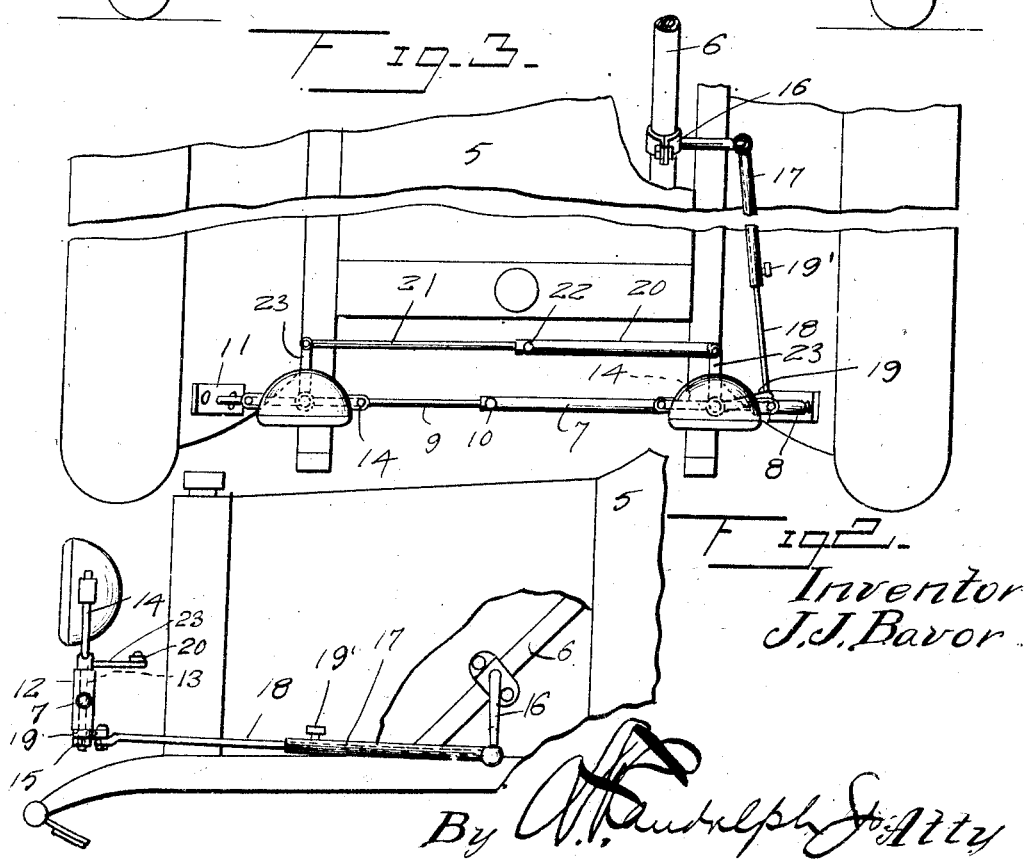
Inventor
J.J. Bavor

UNITED STATES PATENT OFFICE.

JOHN JOSEPH BAVOR, OF CLEVELAND, OHIO.

DIRIGIBLE HEADLIGHT.

1,373,706.  Specification of Letters Patent.  Patented Apr. 5, 1921.

Application filed February 6, 1920. Serial No. 356,679.

*To all whom it may concern:*

Be it known that I, JOHN JOSEPH BAVOR, a citizen of the United States, residing at Cleveland, in the county of Cuyahoga and State of Ohio, have invented certain new and useful Improvements in Dirigible Headlights; and I do hereby declare the following to be a full, clear, and exact description of the invention, such as will enable others skilled in the art to which it appertains to make and use the same.

My invention relates to dirigible headlights for automobiles and has as its principal object the provision of a headlight of this type, the operating parts of which may be adjusted to permit the structure to be used in conjunction with automobiles of various types and dimensions.

Another object of the invention resides in a dirigible head light which may be used in conjunction with various types of automobiles and can be quickly and readily associated therewith.

Another object of the invention is to provide a dirigible head light which is simple in construction, consists of few parts, and may be manufactured and sold at a minimum cost.

With the above and other objects and advantages in mind, my invention consists in the novel combination of elements, construction and arrangements, operation and specific features all of which will be hereinafter enlarged upon and recited in the subjoined claim, the invention being illustrated in the attached drawing, wherein:

Figure 1 is a front elevation of an automobile equipped with my improved headlight;

Fig. 2 is a side elevation of the same; and Fig. 3 is a plan view of the device.

Referring in detail to the drawing wherein like characters of reference denote like parts throughout the several views, the numeral 5 designates an automobile of a well known type while 6 indicates the steering post.

I provide a tube 7 which is disposed forwardly of the radiator of the automobile and transversely thereof and is formed with a curved plate 8 at one end which is secured to the adjacent mud guard in any well known manner. A rod 9 is longitudinally adjustable in the tube 7 and is held in adjusted position by a set screw 10 carried by this tube. The outer end of the rod 9 is provided with a curved plate 11 which is secured to the adjacent mud guard by suitable fastenings.

Carried by the tube 7 and the rod 11 upon opposite sides of the radiator is a pair of upstanding sleeves 12 in which the revoluble stems 13 of the lamp supports 14 are mounted. Nuts 15 are engaged upon the lower ends of the stems 13 to retain the lamp supports against vertical movement.

Extending laterally from the steering post 6 is an outstanding arm 16 and carried by the outer end of this arm 16 is a forwardly extending tube 17 in which an operating rod 18 is longitudinally adjustable and is held in adjusted position by a set screw 19 carried by the tube 17. Fixed to the lower end of the stem of the left hand lamp support is a crank arm 19 having pivotal connection with the forward end of the rod 18.

Disposed above the tube 7 and extending parallel thereto is a tube 20 in which a rod 21 is adjustably mounted and which is held in adjusted position by a set screw 22 carried by the tube 20. Extending laterally from the stems of the lamp supports at points above the sleeves 12 and disposed in parallelism are crank arms 23 one of which being pivotally connected to the outer end of the rod 21 and the other having pivotal connection with the outer end of the tube 20.

From the foregoing it will be seen that upon shifting the steering post 6 in the usual manner the lamps will be caused to turn simultaneously with the turning of the steering wheel and follow the course of the same.

It will also be seen that the particular mounting of the lamp is such as to permit the apparatus to be used in conjunction with automobiles of various widths.

The structure illustrated and described is a practical embodiment of my invention but it will be stated that the same may be modified in many respects, and that my limits of such modification are only governed by what is claimed.

What is claimed is:—

A dirigible headlight for automobiles comprising telescopic members having their outer ends provided with curved plates adapted to be secured to the mud guards of the automobile, upstanding sleeves carried by the telescopic members adjacent their outer ends, revoluble lamp supports mounted in the sleeves, a longitudinally adjustable connection between the lamp supports, a crank arm extending laterally from one of the lamp supports, and an operating connection between the crank arm and the steering post of the automobile.

In testimony whereof I affix my signature in presence of two witnesses.

JOHN JOSEPH BAVOR.

Witnesses:
 CHARLES LEHMAN,
 MICHAEL JOHN HOWARD.